United States Patent Office 3,647,767
Patented Mar. 7, 1972

3,647,767
CURABLE, AMORPHOUS, OLEFINIC
TERPOLYMERS
Sebastiano Cesca, Arnaldo Roggero, and Walter Marconi,
San Danato Milanese, Italy, assignors to Snam Progetti
S.p.A., Milan, Italy
No Drawing. Filed Sept. 5, 1969, Ser. No. 855,740
Claims priority, application Italy, Sept. 5, 1968,
20,869/68
Int. Cl. C08f 17/00
U.S. Cl. 260—80.7
7 Claims

ABSTRACT OF THE DISCLOSURE

Novel terpolymers are disclosed comprising two different α-olefins and an orthocondensed isopropylidene-containing polycyclic polyene having the formulas:

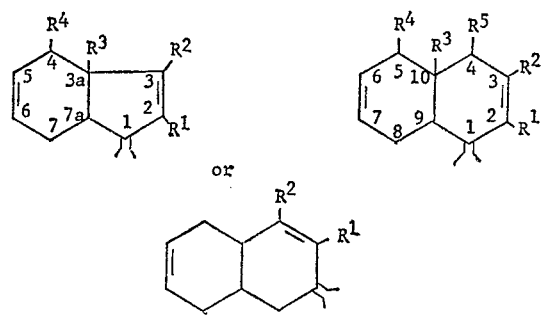

wherein each of said R', $R^2$, $R^3$, $R^4$ and $R^5$ is H, methyl or ethyl, provided at least one of said $R^1$ or $R^2$ is methyl or ethyl, the concentration of said polycyclic polyene in the terpolymer being from 1 to 30% by weight and the mole ratio of said different alpha-olefins being in the range from 1:4 to 4:1.

---

This invention relates to an improvement in curable, amorphous, olefinic terpolymers.

In U.S. Patent 3,464,959 issued Sept. 2, 1969, there is described and claimed a curable, amorphous, linear terpolymer of ethylene, an alpha-mono-olefin having 3 to 6 carbon atoms, and an orthocondensed polycyclic polyene substituted by at least one alkylidene group whose double bond is conjugated with a double bond of a cyclic ring of the polyene.

These terpolymers, while showing a high utilization of the polyene monomer and a good stability to chemical reagents, e.g. ozone, and atmospheric agents due to their low degree of unsaturation, possess a vulcanization rate which leaves room for improvement.

We have now found that if a derivative substituted by at least one alkyl group on at least one of the carbon atoms of the ring double bond conjugated with the double bond of the alkylidene group is employed as the termonomer in preparing the terpolymer, the resulting product has a vulcanization rate much higher than that of the terpolymer obtained from the corresponding unsubstituted polyenes.

Accordingly, one aspect of the present invention provides a curable, amorphous, olefinic terpolymer of two different alpha-olefins having up to 10 carbon atoms, and an orthocondensed polycyclic polyene substituted by at least one alkylidene group of which the double bond is conjugated with a double bond of a cyclic ring of the polyene, the polyene also being substituted by an alkyl group on at least one of the carbon atoms of the cyclic ring double bond conjugated with the double bond of the alkylidene group.

Examples of polyenes which can be employed in the present invention include: (a) 1-isopropylidene-2 or/and 3-methyl - 3a,4,7,7a - tetrahydroindene; (b) 1-isopropylidene-2 or/and 3-ethyl-3a,4,7,7a-tetrahydroindene; (c) 1-isopropylidene-2 or/and 3-methyl - 1,4,5,8,9,10-hexahydronaphthalene; (d) 1-isopropylidene-3 or/and 4-methyl-1,2,5,8,9,10-hexahydronaphthalene, (e) 1-isopropylidene-2,3,4-trimethyl-3a,4,7,7a-tetrahydroindene; and (f) 1-isopropylidene-2,3,10-trimethyl - 1,4,5,8,9,10 - hexahydronaphthalene. These compounds have the following formulae, respectively:

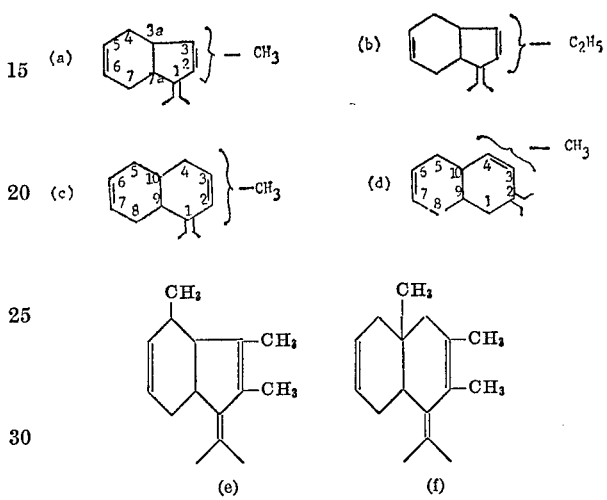

Examples of suitable alpha-olefins include ethylene, propylene, butenes, pentenes, methyl-pentenes and hexenes. Preferably, the two α-olefins used are ethylene and propylene.

According to another aspect of the present invention, there is provided a process for preparing the terpolymer of the invention, which comprises polymerising a mixture of the two different alpha-olefins and the orthocondensed polycyclic polyene in the presence of a polymerisation catalyst.

A suitable catalyst is one which comprises a compound of a transition metal of Groups IV to VIII of the Periodic Table and an aluminum compound having the formula $AlR^1X^1X^2$ wherein $R^1$ is a hydrogen atom or an alkyl groups having from 1 to 10 carbon atoms, and each of $X^1$ and $X^2$, which may be the same or different, is a hydrogen atom, a halogen atom, an alkyl group having from 1 to 10 carbon atoms or a secondary amine group.

$Al(n-C_{10}H_{21})_3$ $Al(n-C_6H_{13})_3$ $Al(n-C_4H_9)_3$ $AlCl_2(C_2H_5)$ $Al(i-C_4H_9)_2Cl$ $Al(i-C_4H_9)$ $Al(C_2H_5)_2Cl$ $AlHCl_2 \cdot O(C_2H_5)_2$ $AlH_2N(CH_3)_2$ $AlH_3 \cdot N(CH_3)_3$ $AlHClN(CH_3)_2$ Another suitable catalyst comprises a compound of a transition metal of Groups IV to VII of the Periodic Table and an aluminum compound which is a polyimino-alane. Preferably, the polyimino-alane contains in its molecule groups having the formula

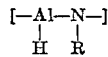

wherein R represents an alkyl, aryl or cycloalkyl hydrocarbon radical.

Preferably the transition metal compound is $VCl_4$, $VOCl_3$, vanadium triacetylacetonate, $VClO(OC_2H_5)_2$, $VCl_3 \cdot 3THF$ or $TiCl_4$.

The polymerisation reaction may be carried out in the presence of an inert hydrocarbon solvent, e.g. n-heptane, or in one or more of the monomers when kept in the liquid state.

The catalyst may be preformed in presence or absence of at least one monomer, or may be found "in situ." The temperatures employed are those usually employed in this kind of reaction, and may range in general from $-60°$ to $100°$ C.

The pressure used is one between the pressure necessary to maintain, at least partially, the monomers in a liquid state and 100 atmospheres, preferably from 1 to 80 atmospheres.

The course of the vulcanization reaction may be studied by noting the torque measured by an oscillating plate vulcameter (Zwick type) during the vulcanization. The torque is proportional to the degree of vulcanization. It is assumed that the maximum variation of the torque is the difference between the torque measured after the first 250 minutes of vulcanization, and the torque initially measured, i.e. $G_{250} - G_{min} = G_{max}$; furthermore, it is assumed that the concentration of double bonds at a time $t$, is $G_{250} - G_t$, i.e. the difference between the assumed maximum and the torque at time $t$.

The course of vulcanization satisfies a kinetic equation of the second order, which may be expressed as follows:

$$\frac{dG_t}{dt} = K(G_{max} - G_t)^2$$

From this it is possible to evaluate the vulcanization rate constant K, once $G_{max}$ and $t_{50}$, which is the time required to obtain 50% of $G_{max} - G_{min}$, are known, using the following equation:

$$K = \frac{1}{G_{max} \cdot t_{50}}$$

The present invention also provides an elastomeric material comprising a vulcanizable or vulcanized terpolymer according to the invention.

The following examples illustrate the present invention, although Examples 2, 4 and 6 are included for comparative purposes only.

EXAMPLE 1

A 1500 ml. capacity glass reactor was charged, in the presence of a nitrogen stream, with 1000 ml. of anhydrous n-hexane; the reactor, fitted with an efficient stirrer and thermometer sheath, was placed over a thermostatically controlled bath maintained at 20° C., and kept at this temperature throughout the whole polymerisation. A gaseous mixture of ethylene and propylene having a molar ratio of 0.5:1 was passed into the n-hexane with a rate of flow of 1200 Nl./h. for 20 minutes, Nl. being the volume in litres measured under standard conditions.

In order to facilitate the attainment of the saturation equilibrium, the solvent was vigorously stirred and the gaseous mixture was fed to the bottom of the reactor, the latter being suitably shaped so as to afford a quick dispersion of the gaseous mixture into the solvent.

The 24.0 mmoles of $(C_2H_5)_2AlCl$ and 12.0 mmoles of anisole were introduced into the reactor, still vigorously stirring the solvent. Then 54.2 mmoles of a mixture of 2- and 3-methyl-1-isopropylidene-3a,4,7,7a-tetrahydroindene were introduced into the reactor. The polymerization reaction was primed by further introducing 4 mmoles of $VCl_4$, and there was continuously blown into the solution a gaseous stream of ethylene and propylene having the same composition and rate of flow as that initially introduced.

The polymerization was carried out for 8 minutes, 30 seconds; it was stopped by the addition of 1 ml. of butyl alcohol to the reaction solution. The latter was coagulated by pouring it, with vigorous stirring, into a vessel containing a few litres of acetone and 5 g. of AO-4010 amine anti-oxidant. There was obtained from the coagulating bath an elastomer having the aspect of uncured rubber. This was dried under vacuum at 50° C. and the dried product weighed 26.5 g. and had a termonomer content of 9.5% by weight. When examined with X-rays, it proved to be essentially amorphous, with an ethylene content of 56% by weight; its intrinsic viscosity was determined in toluene at 30° C. and found to be 2.14 dl./g. A fraction of the terpolymer was subjected to a curing treatment in an oscillating plate Zwick rheometer with an angle of twist, $a = 1.5°$, employing the following formulation in parts by weight:

Polymer: 100 parts
HAF: 50 parts
ZnO: 5 parts
Circosol 4240: 5 parts
MBT: 0.5 parts (MBT=mercaptobenzothiazole)
TMTS: 1 part (TMTS=tetramethyl-thiuramdisulphide)
Sulphur: 2 parts
Curing temperature=145° C.

The following results were obtained:

$t_i$ (induction time)=1'30''; $t_{50}=4'$; $t_{70}=7'$; $t_{90}=30'$; where $t_{50}$, $t_{70}$ and $t_{90}$ are times necessary to obtain 50, 70 and 90%, respectively, of the maximum modulus in torsion. K, the rate constant for the whole vulcanization reaction=0.517 min.$^{-1}$·m.$^{-1}$·Kg.$^{-1}$, and $G_{max}$, the maximum torque measured at the end of the vulcanization =0.635 m.kg.

EXAMPLE 2

The procedure employed was identical to that in Example 1, except that 1-isopropylidene-3a,4,7,7a-tetrahydroindene was used instead of the mixture of the 2- and 3-methyl-derivatives. 23 grams of polymer were obtained, containing 64% of the termonomer; furthermore $[\eta] = 2.03$ dl./g.

After curing according to the preceding procedure, the following results were obtained:

$t_i=2'$; $t_{50}=8'45''$; $t_{70}=20'30''$; $t_{90}=53'$; K=0.290 min.$^{-1}$·m.$^{-1}$·kg.$^{-1}$; and $G_{max}=0.529$ m.kg.

These results compare unfavourably with those expressed in Example 1.

EXAMPLE 3

The procedure of Example 1 was repeated, except that this time 38.0 mmoles of 1-isopropylidene-2 and 3-methyl-1,4,5,8,9,10-hexahydronaphthalene were introduced into the reactor as the termonomer. After 6 minutes' reaction 27.7 g. of an elastomer were obtained, which showed a termonomer content of 7.7% by weight; the intrinsic viscosity measurement in toluene at 30° C. gave a value of 2.08 dl./g., and the ethylene content was 54% by weight. After vulcanization, following the procedure of Example 1, the following results were obtained:

$t_i=1'45''$; $t_{50}=3'$; $t_{70}=7'$; $t_{90}=33'30''$; K=0.766 min.$^{-1}$·m.$^{-1}$·kg.$^{-1}$; and $G_{max}=0.507$ m.kg.

EXAMPLE 4

The procedure of Example 3 was repeated, except that 1-isopropylidene-1,4,5,8,9,10-hexahydronaphthalene was employed instead of the mixture of the 2- and 3-methyl derivatives. There were obtained 25.2 g. of a terpolymer, with a termonomer content of 5.8% and a viscosity of 1.35 dl./g. After vulcanization, the following results were observed:

$t_1=2'30''$; $t_{50}=7'$; $t_{70}=19'30''$; $t_{90}=77'30''$; K=0.311 min.$^{-1}$·m.$^{-1}$·kg.$^{-1}$; and $G_{max}=0.558$ m.kg.

Thus, it can be seen that vulcanization did not occur as rapidly as in Example 3.

EXAMPLE 5

The procedure was the same as that described in Example 1, except that there were employed 18 mmoles of $(C_2H_5)_2AlCl$, 3 mmoles of vanadium triacetylacetonate and as the termonomer 38 mmoles of 1-isopropylidene-2,3,4-trimethyl-3a,4,7,7a-tetrahydroindene. The polymerization was carried out at 0° C. for 10 minutes. After drying, there were obtained 58.2 g. of a polymer which showed a termonomer content of 11.6% by weight, a viscosity of 1.07 dl./g. and an ethylene content of 53% by weight. After vulcanization according to the procedure specified in Example 1, the following results were obtained:

$t_1=2'$; $t_{50}=6'30''$; $t_{70}=13'30''$; $t_{90}=32'$; K=0.443 min.$^{-1}$·m.$^{-1}$·kg.$^{-1}$; and $G_{max}=0.521$ m.kg.

EXAMPLE 6

The procedure was similar to that of Example 5, except that in this case 1-isopropylidene-3a,4,7,7a-tetrahydroindene was used as the termonomer. An elastomer was obtained having a termonomer content of 9.50%, and a viscosity of 1.13 dl./g. After vulcanization, the following results were obtained:

$t_1=3'$; $t_{50}=8'$; $t_{70}=19'$; $t_{90}=53'$; K=0.254 min.$^{-1}$·m.$^{-1}$·kg.$^{-1}$; and $G_{max}=0.392$ m.kg.

What we claim is:

1. A curable, amorphous, olefinic linear terpolymer of two different alpha-olefins having up to 10 carbon atoms, and an orthocondensed isopropylidene-containing polycyclic polyene having the formulas:

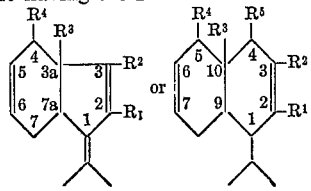

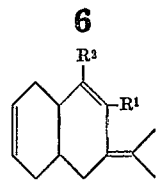

wherein each of said R', $R^2$, $R^3$, $R^4$ and $R^5$ is H, methyl or ethyl, provided at least one of said $R^1$ or $R^2$ is methyl or ethyl, the concentration of said polycyclic polyene in the terpolymer being from 1 to 30% by weight and the mole ratio of said different alpha-olefins being in the range from 1:4 to 4:1.

2. A terpolymer as claimed in claim 1, wherein the polycyclic polyene is 1-isopropylidene-2-methyl-hexahydronaphthalene, 1 - isopropylidene - 3 - methyl-hexahydronaphthalene or a mixture thereof.

3. A terpolymer as claimed in claim 1, wherein the polyclic polyene is 1-isopropylidene-2,3,4-trimethyltetrahydroindene.

4. A terpolymer as claimed in claim 1, wherein the polycyclic polyene is 1-isopropylidene-2-methyltetrahydroindene, 1 - isopropylidene - 3 - methyl-tetrahydroindene or a mixture thereof.

5. A terpolymer as claimed in claim 1, wherein one of the alpha-olefins is ethylene.

6. A terpolymer as claimed in claim 1, wherein one of the alpha-olefins is propylene.

7. A terpolymer as claimed in claim 1, wherein said different α-olefins are ethylene and propylene and their mole ratio is from 1:4 to 4:1.

References Cited
UNITED STATES PATENTS 3,464,959    9/1969    Marconi et al. _____ 260—79.5
3,489,733    1/1970    Natta et al. _____ 260—80.78

JAMES A. SEIDLECK, Primary Examiner

S. M. LEVIN, Primary Examiner

U.S. Cl. X.R.

260—41 B, 79.5 B, 80.78

PO-1050
(5/69)

UNITED STATES PATENT OFFICE
CERTIFICATE OF CORRECTION

Patent No. 3,647,767                                Dated  March 7, 1972

Inventor(s) Sebastiano Cesca et al.

It is certified that error appears in the above-identified patent and that said Letters Patent are hereby corrected as shown below:

Column 2, line 53, after "group." insert the following sentence as a new paragraph:

"Examples of suitable aluminum compounds are:"

Column 2, line 61, change "Al(i-$C_4H_9$)" to --Al(i-$C_4H_9$)$Cl_2$--.

Claim 3, line 2, change "polyclic" to --polycyclic--.

Signed and sealed this 26th day of December 1972.

(SEAL)
Attest:

EDWARD M. FLETCHER, JR.
Attesting Officer

ROBERT GOTTSCHALK
Commissioner of Patents